United States Patent [19]

Nakamura et al.

[11] Patent Number: 5,504,051
[45] Date of Patent: Apr. 2, 1996

[54] CERAMIC SHEET WITH CATALYST AND ITS MANUFACTURING METHOD

[75] Inventors: Kenichi Nakamura, Settsu; Kunio Kimura, Kyoto; Hironao Numoto, Ikoma; Tetsuo Terashima, Neyagawa, all of Japan

[73] Assignee: Matsushita Electric Industrial Co., Ltd., Kadoma, Japan

[21] Appl. No.: 139,037

[22] Filed: Oct. 21, 1993

[30] Foreign Application Priority Data

Oct. 27, 1992 [JP] Japan ..................... 4-289070

[51] Int. Cl.$^6$ ..................... B01J 21/08
[52] U.S. Cl. ..................... 502/261; 502/262; 502/527
[58] Field of Search ..................... 502/261, 262, 502/527

[56] References Cited

U.S. PATENT DOCUMENTS

| | | | |
|---|---|---|---|
| 3,697,447 | 10/1972 | Bettinardi . | |
| 3,867,311 | 2/1975 | Johnson | 502/262 |
| 5,155,083 | 10/1992 | Yoshida et al. | 502/242 |
| 5,179,061 | 1/1993 | Haerle | 502/339 |
| 5,202,299 | 4/1993 | Symons et al. | 502/261 |

FOREIGN PATENT DOCUMENTS

| | | | |
|---|---|---|---|
| 0429994 | 6/1991 | European Pat. Off. . | |
| 2169322 | 9/1973 | France . | |
| 0041301 | 12/1970 | Japan | 502/262 |
| 1230-736 | 10/1985 | Japan | 502/527 |
| 3154638 | 7/1991 | Japan | 502/262 |
| WO83/01017 | 3/1983 | WIPO . | |

*Primary Examiner*—Asok Pal
*Attorney, Agent, or Firm*—Beveridge, DeGrandi, Weilacher & Young

[57] ABSTRACT

To present a ceramic sheet with catalyst high in porosity, excellent in combustion efficiency, and easy to process into any desired shape, an inorganic oxide 4 carrying a noble metal catalyst 5 is dispersed and mixed together with ceramic fibers 1 and an inorganic binder 2, and an inorganic flocculant and an organic binder 3 possessing the flocculating effect are added to form flocs, a sheet is formed by a paper making method, and it is heated at 950° C. or less, thereby obtaining a ceramic sheet carrying the noble metal catalyst in a state of being uniformly dispersed in the entire inner parts.

17 Claims, 2 Drawing Sheets

CERAMIC SHEET WITH CATALYST AND ITS MANUFACTURING METHOD

BACKGROUND OF THE INVENTION

1. Field of the Invention

The present invention relates to a ceramic sheet with catalyst mainly composed of an inorganic oxide carrying a catalyst and heat resistant ceramic fibers, and more particularly to a ceramic sheet with catalyst possessing an action to oxidize and decompose organic compounds by the catalytic activity, and a method of manufacturing the same.

2. Related Art of the Invention

Recently the catalytic combustion system of burning fuel gas by catalyst has been noticed as a combustion system low in emission of environmental pollutants.

The catalyst conventionally used in catalytic combustion was carried on honeycomb ceramics of cordierite or the like. However, the porosity of honeycomb ceramics is as low as 30%, and the pressure loss is significant, and yet the degree of freedom of structure is small, and hence it was difficult to form a desired shape.

Accordingly, taking note of the free processability of commercial ceramic sheets, it has been attempted to form a catalyst layer on the surface by applying a slurry composed of an inorganic compound carrying a catalyst on a ceramic sheet.

In such conventional method, however, since the surface of the ceramic sheet is covered with an inorganic oxide, the combustion gas does not permeate widely into the inner parts of the ceramic sheet, and catalytic combustion reaction takes place only on the surface layer, and therefore the combustion efficiency is very poor.

Besides, the processability is poor because of the toughness of ceramic fibers composing the ceramic sheet, and the catalyst is hardly dispersed uniformly when dipping into the slurry containing the catalyst.

On the other hand, as a method of carrying a catalyst uniformly into inner parts, a method of immersing a ceramic sheet in a solution containing noble metal salt, and impregnating the noble metal salt in the ceramic sheet may be considered, but in this method, it is hard to carry the catalyst uniformly.

In the light of such problems of the conventional catalyst carriers, it is an object of the invention to present a ceramic sheet with catalyst high in porosity, excellent in combustion efficiency, and easy in processability into any desired shape.

SUMMARY

A method of manufacturing a ceramic sheet with catalyst of the present invention comprises:

a step of carrying a noble metal catalyst on an inorganic oxide, a step of uniformly dispersing the inorganic oxide carrying the noble metal catalyst, together with ceramic fibers and organic binder and/or inorganic binder to prepare a slurry, a step of adding a flocculant to the slurry to prepare flocs, a step of forming a sheet from the flocs by paper making method, and a step of heating the sheet.

Additionally, another method of manufacturing a cermanic sheet with catalyst of the present invention comprises:

a step of uniformly dispersing a noble metal catalyst, together with an inorganic oxide, ceramic fibers and organic binder and/or inorganic binder to prepare a slurry, a step of adding a flocculant to the slurry to prepare flocs, a step of forming a sheet from the flocs by a paper making method, and a step of heating the sheet.

Another method of manufacturing a ceramic sheet with catalyst of the present invention comprises:

a step of carrying a noble metal catalyst on an inorganic oxide, a step of uniformly dispersing the inorganic oxide carrying the noble metal catalyst, together with ceramic fibers or ceramic fibers and inorganic binder to prepare a slurry, a step of adding an organic flocculant having also a binder function to the slurry to prepare flocs, a step of forming a sheet from the flocs by a paper making method, and a step of heating the sheet.

Finally, another method of manufacturing a ceramic sheet with catalyst of the present invention comprises:

a step of uniformly dispersing a noble metal catalyst, together with an inorganic oxide and ceramic fibers or ceramic fibers and inorganic binder to prepare a slurry, a step of adding an organic flocculant having also a binder function to the slurry to prepare flocs, a step of forming a sheet from the flocs by a paper making method, and a step of heating the sheet.

According to the invention, since the noble metal catalyst is uniformly dispersed and carried in the ceramic sheet without sacrificing the porosity as in the prior art, a ceramic sheet with catalyst excellent in combustion efficiency can be presented. Besides, by heat treatment after processing in a wet state after forming into a sheet by the wet paper making process, a ceramic sheet of a desired shape can be obtained.

PREFERRED EMBODIMENTS

Figure 1:
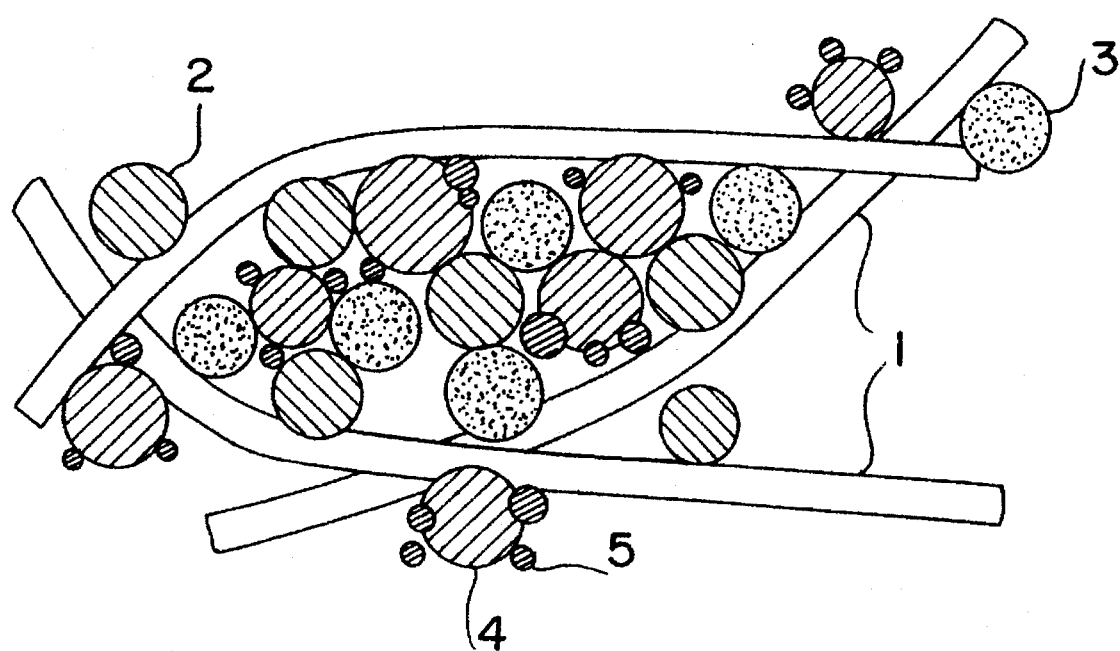
FIG. 1 is a partial magnified view of a ceramic sheet with catalyst according to an embodiment of the present invention.

Referring now to the drawings, embodiments of the invention are described in detail below.

First the noble metal catalyst of the invention is described. The noble metal catalyst of the invention comprises a platinum group metal such as platinum, palladium and rhodium, and it possesses the property of burning combustion gas or the like or decomposing odorous substances by its catalytic oxidation action. The platinum group metal is obtained by pyrolysis of nitrate, amine complex, etc. The noble metal catalyst is chemically adsorbed on the surface of the inorganic oxide used as a catalyst carrier, so that the catalyst is hardly peeled off the carrier.

A precious metal to be used is selected according to the conditions at combustion. For example, when a large quantity of air is supplied at combustion, platinum is most suitable for the catalyst, but when a small quantity of air is supplied at combustion, palladium or rhodium is most suitable.

The inorganic oxide used as the catalyst carrier in the invention is described specifically. In order that the inorganic oxide of the invention may function as the carrier of the catalyst, it requires the function of exhibiting the catalyst oxidation action sufficiently by contributing to smooth dispersion of the noble metal catalyst. Therefore, a substance having a wide specific surface area is desired. Inorganic oxides with a wide specific surface area include activated alumina, zeolite, and silica gel, among others. Specifically, as the catalyst carrier for promoting combustion reaction, activated alumina is particularly preferable among them from the view point of heat resistance. Activated alumina is a metastable alumina with large specific surface area, such as β-, γ-, δ-, θ-, η-, ρ-, and χ- alumina, but when such activated alumina is exposed to high temperature, it is transformed into an α-alumina which is stable and small in specific surface area, and therefore it is necessary to select the crystal form by properly controlling the temperature and other conditions. Alternatively, an aluminum hydroxide which is changed into an activated alumina by heat treatment may be used.

The mean particle size of the inorganic oxide of the invention is desired to be 6 μm or less (preferably 1.5 μm or less). At the mean particle size exceeding 6 μm, the coagulating force is lowered, and the powder of the inorganic oxide is likely to drop after drying the ceramic sheet. In particular, when the mean particle size is 1.5 μm or less, the coagulating force of the inorganic oxide itself is extremely raised, and the strength may be sufficiently kept without using inorganic binder.

Incidentally, when barium oxide is added as an additive to the inorganic oxide of the invention, lowering of the specific surface area is small if exposed to high temperature, and hence high activity may be maintained. The content of barium oxide is preferred to be 0.5 to 5 wt. % of the inorganic oxide. When the content of barium oxide exceeds 5 wt. %, the adhesion characteristic of the inorganic oxide is lowered, and if less than 0.5 wt. %, sufficient effect due to the addition of barium oxide is not obtained. Meanwhile, a similar additive effect is obtained by using barium carbonate instead of barium oxide. Preferably, the content of barium carbonate is 0.5 to 5 wt. % as converted into the amount of barium oxide.

When cerium oxide or any metal salt which becomes cerium oxide when heated by pyrolysis, such as nitrate, acetate, and hydroxide, is added to the inorganic oxide of the invention as an additive, the oxidation and decomposing characteristic of the catalytic substance is improved by the co-catalyst effect of cerium oxide. The content of the cerium oxide compound is desired to be 2 to 15 wt. % of the inorganic oxide as converted to the amount of cerium oxide. When the content of cerium oxide exceeds 15 wt. %, the oxidation and decomposing characteristic of the catalytic substance begins to drop; and at less than 2 wt. %, sufficient additive effect of cerium oxide is not obtained.

The inorganic binder of the invention is described below. Inorganic binders of ceramic sheets are roughly classified into two types, one for bringing about strength by heating and fusions such as glass and the other for bringing about strength by a chemical bond and sintering by a dehydration reaction, such as colloidal silica and silica gel. The type of inorganic binders which obtain strength by fusion, such as glass, is not suited to the ceramic sheet of the invention because the catalyst surface is covered with glass, and the catalytic activity is lowered. Instead, colloidal silica and colloidal alumina are preferred because the dispersion is excellent and a high strength is obtained. The content of the inorganic binder of the invention is preferred to be 5 to 30 wt. %. If the content of the inorganic binder exceeds 30 wt. %, the catalyst surface is covered with the inorganic binder, and the oxidation and decomposing characteristic of the catalyst begins to drop, or if less than 5 wt. %, sufficient sheet strength is not obtained.

Next is described the ceramic fiber of the invention. As heat resistant ceramic fibers, alumina fiber, aluminosilicate fiber, aluminoborosilicate fiber, mullite fiber, and others mainly composed of $SiO_2$ and $Al_2O_3$ are known. These ceramic fibers are composed of the $SiO_2$—$Al_2O_3$ system wherein the eutectic point is close to 1600° C., and hence possess high heat resistance. However, mullite fiber and alumina fiber are polycrystals and are very fragile, and they are not suited to the invention because the mechanical strength is lowered when formed into a ceramic sheet. On the other hand, aluminosilicate fiber and aluminoborosilicate fiber are amorphous and are sufficient in mechanical strength when formed into sheet, and have enough toughness on paper, and are hence preferable as the ceramic fiber of the invention. But, when heated at about 950° C. and 850° C., respectively, the aluminosilicate fiber and aluminoborosilicate fiber precipitate mullite crystals and become brittle, and therefore the heat treatment temperature must be controlled under 950° C. and 850° C., respectively, when using the aluminosilicate fiber and aluminoborosilicate fiber. Aside from $SiO_2$ and $Al_2O_3$ of rock wool or the like, ceramic fibers containing alkaline metal oxide, alkaline earth metal oxide and others may be also used.

The method of manufacturing of ceramic sheet with catalyst of the invention is described below.

The invention forms a ceramic sheet by a method of preparing a slurry by uniformly dispersing an inorganic oxide carrying noble metal and ceramic fibers together with inorganic binder and organic binder, forming flocs by adding an electrolyte to the slurry, and forming into a sheet by a wet paper making process (hereinafter called the paper making method).

In the ceramic sheet with catalyst of the invention, the inorganic binder, for example in the case of colloidal silica, obtains a high strength by heating over 600° C. because Si—O—Si bonds (siloxane bond) are caused by a dehydration reaction of the surface Si—OH groups (silanol group). Accordingly, with the inorganic binder alone, the strength of the sheet right after paper making is insufficient, and processability is poor. Therefore, it is preferred to add an organic binder in order to obtain a sheet strength right after paper making. Similar effects are obtained by using colloidal alumina.

As the organic binder, polyvinyl alcohol, polyamidoepichlorohydrine resin, polyacrylamide, starch, etc. are used. Usually, such cationic high polymers and their mixtures are used, but the same effects are also exhibited by using nonionic resins such as vinyl acetate resin and vinyl acetate-acrylic copolymer resin. These high polymers act to adsorb by neutralization of electric charges on the inorganic material, and are firmly bonded to pulp and others by hydrogen bonds. The organic binder begins to exhibit its effect when added by about 0.2 to 0.9% to the solid content, and by addition of 2 to 16%, it is more effective because the effects of flocculant as mentioned below are also demonstrated.

The flocculant is used to build up the strength by mutually entangling the ceramic fibers and inorganic binder. Since the ceramic fibers and inorganic binder are negatively charged, when the electric charges are neutralized by metal cation or low molecular cationic polymer, the ceramic fibers and inorganic binder collide with each other and gather and flocculate firmly by the traction between molecules built up at this time. When metal cations are used, the flocculating force is stronger when the valency of positive charges is greater, and therefore $Al^{3+}$ cations are generally used as the flocculant (alum, aluminum chloride, etc.). By the flocculating force of metal cations alone, turbidity of white liquor occurs, and therefore organic flocculants such as starch and polyacrylamide are also used. Since the organic flocculant also possesses the effect of a binder, it is more effective. Generally, cationic high molecular flocculants are used in the paper making industry, but in the invention, since many interfering ions are contained in the slurry, stable paper making is possible by using a high molecular flocculant possessing both cationic group and anionic group.

In the conventional dip method, it was difficult to keep constant the solid content and viscosity of the slurry because of shearing stress caused at the time of evaporation of moisture in the slurry or agitation of the slurry, and a large portion of slurry must be discarded, but according to the invention, since the catalyst slurry is taken into the sheet by 100%, it is very efficient, and the manufacturing cost may be notably decreased.

More practical examples of the invention are illustrated below. FIG. 1 is a magnified schematic diagram of a ceramic sheet with catalyst according to an embodiment of the invention.

(EXAMPLE 1)

As ceramic fibers, 1000 g of aluminosilicate fibers with a mean fiber diameter of about 3 μm and chopped in a length of 0.1 to 10 mm were dispersed sufficiently and suspended in 600 kg of water. Next, 300 g of activated alumina (γ-alumina) carrying noble metal catalyst (platinum) with a mean particle size of 1 to 6 μm and specific surface area of 250 $m^2/g$ and 60 g (solid equivalent amount) of colloidal silica were mixed while stirring sufficiently.

In the suspension, 100 g of aluminum sulfate was added, and an aqueous solution of sodium hydroxide was added until the pH of the slurry became about 5.5. This is because the flocculating force of $Al^{3+}$ cations reaches the maximum around pH 5.5.

In consequence, 200 g of the organic flocculant mainly composed of cationic starch was added to form a floc suspension, and ceramic paper was prepared by means of an ordinary long net type paper making machine.

The organic flocculant also works as the organic binder.

Thus obtained ceramic paper was heated at 600° C. for 1 hour, and a ceramic sheet with catalyst having a sufficient sheet strength was obtained because the colloidal silica forms a network of $SiO_2$ by the dehydration reaction of colloidal silica.

In the conventional ceramic sheet obtained by drying after dipping into a slurry containing catalyst, since the surface is covered with the inorganic oxide layer carrying the catalyst, the sheet strength is great, but the catalyst is hardly carried uniformly. Furthermore, since the combustion reaction takes place only on the surface, the ceramic fiber layer may be an adiabatic layer to worsen the thermal efficiency depending on the application, and the pressure loss of the fuel gas increases. In the ceramic sheet with catalyst of the invention, by contrast, since an electrolyte is added to the slurry in which the inorganic oxide carrying the catalyst and the ceramic fibers are dispersed uniformly to cause flocculation, the catalyst is dispersed uniformly in the sheet. Still more, the porosity of the sheet is large, and combustion occurs also in the inner parts of the sheet, and therefore the adiabatic layer is rare and pressure loss of combustion gas is small.

A ceramic sheet with catalyst of the invention and a conventional ceramic sheet with catalyst, having the thickness of 0.5 mm and catalyst (platinum) content of 30 mg/100 $cm^2$, were installed on the inner wall of a column of 10×10×100 (mm) made of aluminum of t=1 mm, and burned by passing butane gas, and the pressure loss, combustion efficiency and aluminum surface temperature were measured, of which results are shown in Table 1.

TABLE 1

|  | This invention | Prior art |
| --- | --- | --- |
| Pressure loss in combustion | 6 mmAq | 10 mmAq |
| Combustion efficiency | 94% | 88% |
| Aluminum surface temperature | 220° C. | 209° C. |

In the ceramic sheet of the example, since the combustion gas flows inside of the ceramic sheet, the pressure loss was lower and the combustion efficiency and thermal efficiency were excellent as compared with the prior art.

In this embodiment, the thickness of the ceramic sheet was 0.5 mm and the catalyst amount was 30 mg/100 $cm^2$, but these figures are not limitative.

For the ceramic sheet with catalyst of the invention with the catalyst amount of 30 mg/100 $cm^2$, the conventional ceramic sheet with catalyst by dipping into the catalyst slurry (hereinafter called the dip specimen), and the conventional ceramic sheet with catalyst impregnating the catalyst in the ceramic sheet (hereinafter called the impregnated specimen), the catalyst amount in 30 pieces of each was determined by composition analysis, of which results are shown in Table 2. The mean discrepancy denotes the value calculated by dividing the absolute value of the difference of each measured value and its average value by the average value, and averaging the results.

TABLE 2

|  | This invention | Dip specimen | Impregnated specimen |
| --- | --- | --- | --- |
| Mean discrepancy | ±1.2% | ±6.8% | ±8.3% |

As shown above, the catalyst is carried uniformly in the embodiment, and the discrepancy of the catalyst amount among sheets can be notably decreased.

When folding and processing the ceramic sheet with catalyst of the embodiment, the sheet is likely to be torn apart as compared with the case of folding and processing a thick paper made of organic fibers. This is because the entangling strength of fibers is extremely weaker than that of organic fibers. Therefore, when using the ceramic sheet with catalyst of the embodiment by folding, it is possible to obtain a desired shape without being torn apart when the sheet is processed in wet state. In particular, by drying the sheet after forming the sheet into a desired shape before drying after the paper making process, the desired shape may be easily maintained by the effect of the organic binder.

As ceramic fibers, 1000 g of aluminosilicate fibers with a mean fiber diameter of about 3 µm and chopped in a length of 0.1 to 10 mm were dispersed sufficiently and suspended in 600 kg of water. Next, 300 g of activated alumina (γ-alumina) with a mean particle size of 1 to 6 µm and specific surface area of 250 m²/g, and 60 g (solid equivalent amount) of colloidal silica were mixed while stirring sufficiently.

In the suspension, 100 g of aluminum sulfate was added, followed by 300 g of activated alumina (γ-alumina) with a mean particle size of 1 to 6 µm and specific surface area of 250 m²/g and 6.0 g of platinum chloride acid as the platinum equivalent amount, and an aqueous solution of sodium hydroxide was added until the pH of the slurry became about 5.5. This is because the flocculating force of $Al^{3+}$ cations reaches the maximum around pH 5.5. The prior addition of aluminum sulfate is because secondary particles are hardly formed in an acidic solution.

In consequence, 200 g of the organic flocculant mainly composed of cationic starch was added to form a floc suspension, and ceramic paper was prepared by means of an ordinary long net type paper making machine.

The organic flocculant also works as the organic binder.

Thus obtained ceramic paper was heated at 600° C. for 1 hour, and a ceramic sheet with catalyst having a sufficient sheet strength was obtained because the colloidal silica forms a network of $SiO_2$ by the dehydration reaction of colloidal silica.

In this example, as compared with Example 1, the catalyst carrying step is not necessary, and the same effects as in Example 1 are expected as shown in Table 3, so that the production cost can be reduced, and it is more effective.

TABLE 3

|  | Example 1 | Example 2 |
| --- | --- | --- |
| Pressure loss in combustion | 6 mmAq | 6 mmAq |
| Combustion efficiency | 94% | 93% |
| Aluminum surface temperature | 220° C. | 218° C. |

(EXAMPLE 3)

As ceramic fibers, 500 g of aluminosilicate fibers with a mean fiber diameter of about 3 µm and chopped in a length of 0.1 to 10 mm were used, and as activated alumina, 150 g, 300 g, 500 g, 700 g, 1000 g, 1250 g and 1500 g of activated alumina (γ-alumina) with a mean particle size of 1 to 6 µm and specific surface area of 250 m²/g were used to make ceramic sheets by the same method described in the Example 1. The thickness of each sheet is fixed at about 0.45 mm.

Figure 2:
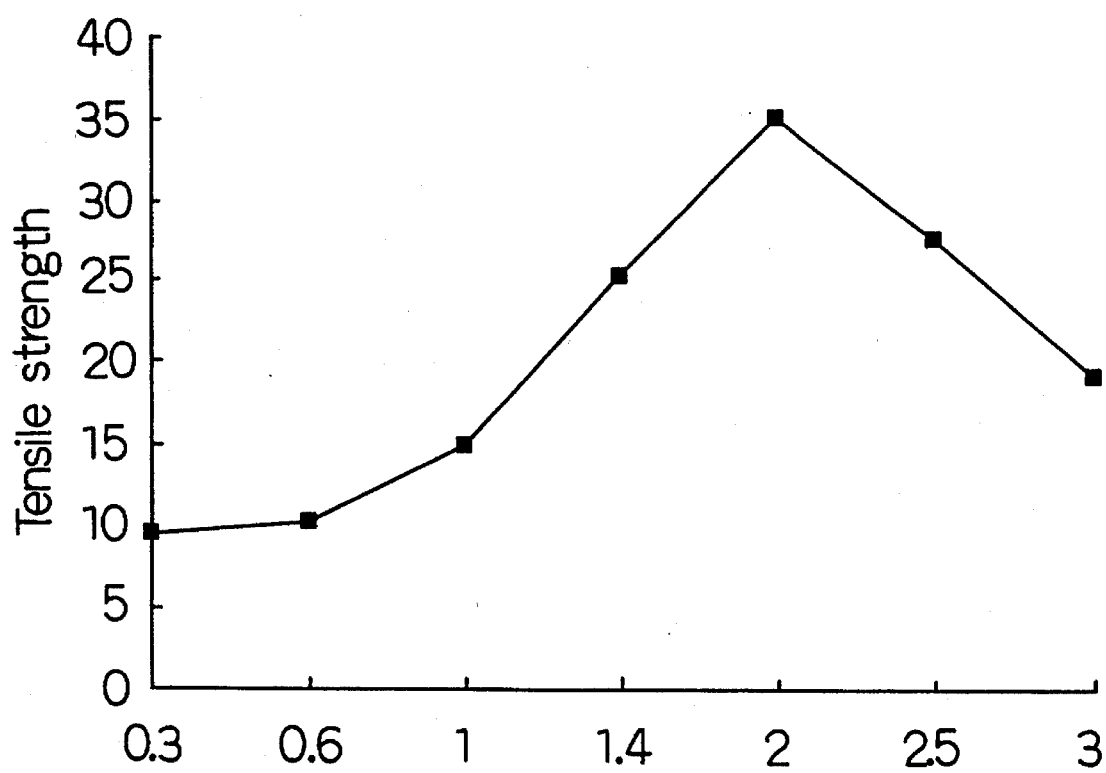
FIG. 2 is a graph showing a relation of the tensile strength of the ceramic sheet and its ratio of ceramic fibers and inorganic oxide.

The tensile strength of each sheet is shown in FIG. 2. When a ratio by weight of ceramic fibers and inorganic oxide is in a range of 1:1.4 (a bulk density is 0.4 g/cm³) to 2.5 (0.7 g/cm³), its tensile strength is up to maximum. If the ratio is under 1:1.4, points of contact with each material are reduced, then the tensile strength becomes lower. On the other hand, if the ratio is over 1:2.5, ceramic fibers are not tangled well to each other, then the tensile strength becomes lower.

Thus, when the ceramic sheet is used at the condition which needs much mechanical strength, the ceramic sheet shown in this example must be used. But when the ceramic sheet is used at the condition which does not need much mechanical strength, the ceramic sheet which has less density than 0.4 g/cm³, for example, what is shown in Example 1, is suitable because back pressure at the combustion is reduced.

As clear from the description herein, according to the invention, since the inorganic oxide carrying the noble metal catalyst is uniformly dispersed in the ceramic sheet, the amount of the noble metal in the ceramic sheet is constant. Besides, since the catalyst slurry is sufficiently taken into the sheet, the material efficiency is very high as compared with the dip method, and the manufacturing cost can be reduced dramatically.

What is claimed is:

1. A ceramic sheet with catalyst, manufactured by a paper making method, comprising: ceramic fibers, and an inorganic oxide carrying a noble metal catalyst, wherein:

a means particle size of the inorganic oxide is 6 µm or less, and the ceramic sheet is made of paper, and the ceramic fibers have a length in the range of 0.1 to 10 mm.

2. A ceramic sheet with catalyst according to claim 1, wherein a ratio by weight of the ceramic fibers and the inorganic oxide is in a range of 1:1.4 to 1:2.5, and a bulk density of the ceramic sheet with catalyst is in the range of 0.4 to 0.7 g/cm³.

3. A ceramic sheet with catalyst according to claim 1, wherein the ceramic fibers are amorphous ceramics mainly composed of $SiO_2$ and $Al_2O_3$.

4. A ceramic sheet with catalyst according to claim 3, wherein the ceramic fibers are aluminosilicate material or aluminoborosilicate material.

5. A method for manufacturing a ceramic sheet with catalyst comprising:

a step of carrying a noble metal catalyst on an inorganic oxide, wherein a means particle size of the inorganic oxide is 6 µm or less, a step of dispersing the inorganic oxide carrying the noble metal catalyst together with ceramic fibers and an organic binder and/or an inorganic binder, in water to thereby prepare a slurry, a step of adding a flocculant to the slurry to prepare flocs, a step of forming a sheet from the flocs by a paper making method, and a step of heating the sheet.

6. A method for manufacturing a ceramic sheet with catalyst comprising:

a step of dispersing a noble metal catalyst, together with an inorganic oxide, ceramic fibers and an organic binder and/or an organic binder, in water to thereby prepare a slurry, wherein a mean particle size of the inorganic oxide is 6 µm or less, a step of adding a flocculant to the slurry to prepare flocs, a step of forming a sheet from the flocs by a paper making method, and a step of heating the sheet.

7. A method for manufacturing a ceramic sheet with catalyst according to claim 5, wherein
the flocculant is composed of at least an aluminum compound and a high molecular flocculant.

8. A method for manufacturing a ceramic sheet with catalyst according to claim 6, wherein
the flocculant is composed of at least an aluminum compound and a high molecular flocculant.

9. A method for manufacturing a ceramic sheet with catalyst according to claim 7, wherein
the high molecular flocculant possesses both a cationic group and an anionic group.

10. A method for manufacturing a ceramic sheet with catalyst according to claim 8, wherein
the high molecular flocculant possesses both a cationic group and an anionic group.

11. A method for manufacturing a ceramic sheet with catalyst comprising:
a step of carrying a noble metal catalyst on a inorganic oxide, wherein a mean particle size of the inorganic oxide is 6 µm or less,
a step of dispersing the inorganic oxide carrying the noble metal catalyst together with ceramic fibers or ceramic fibers and an inorganic binder, in water to thereby prepare a slurry,
a step of adding an organic flocculant to the slurry to prepare flocs, wherein the organic flocculant also has a binder function,
a step of forming a sheet from the flocs by a paper making method, and
a step of heating the sheet.

12. A method for manufacturing a ceramic sheet with catalyst comprising:
a step of dispersing a noble metal catalyst, together with an inorganic oxide and ceramic fibers or ceramic fibers and inorganic binder, in water to thereby prepare a slurry, wherein a means particle size of the inorganic oxide is 6 µm or less,
a step of adding an organic flocculant to the slurry to prepare flocs, wherein the organic flocculant also has a binder function,
a step of forming a sheet from the flocs by a paper making method, and
a step of heating the sheet.

13. A method for manufacturing a ceramic sheet with catalyst according to claim 5, wherein an inorganic binder is included, and the inorganic binder is at least one member selected from the group consisting of colloidal silica and colloidal alumina.

14. A method for manufacturing a ceramic sheet with catalyst according to claim 6, wherein an inorganic binder is included, and the inorganic binder is at least one member selected from the group consisting of colloidal silica and colloidal alumina.

15. A method for manufacturing a ceramic sheet with catalyst according to claim 11, wherein an inorganic binder is included, and the inorganic binder is at least one member selected from the group consisting of colloidal silica and colloidal alumina.

16. A method for manufacturing a ceramic sheet with catalyst according to claim 12, wherein an inorganic binder is included, and the inorganic binder is at least one member selected from the group consisting of colloidal silica and colloidal alumina.

17. A ceramic sheet with catalyst according to claim 1, wherein a mean particle size of the inorganic oxide is 1.5 µm or less.

* * * * *